United States Patent

[11] 3,599,829

[72] Inventors Samuel A. Aidlin
214 Beaumont St.;
Stephen H. Aidlin, 3855 Shore Parkway,
both of Brooklyn, N.Y. 11235
[21] Appl. No. 881,237
[22] Filed Dec. 1, 1969
[45] Patented Aug. 17, 1971

[54] HOPPER-TYPE APPARATUS FOR ORIENTING AND FEEDING BOTTLE AND JAR CAPS, OR THE LIKE
8 Claims, 3 Drawing Figs.

[52] U.S. Cl. .................................................. 221/160, 198/33 R
[51] Int. Cl. .................................................. B23g 7/12
[50] Field of Search .................................................. 221/157, 159, 160, 161, 162, 158; 198/33 R

[56] References Cited
UNITED STATES PATENTS
2,702,064  2/1955  Lange .......................... 198/33 R
3,065,841  11/1962  Stover .......................... 222/160 X
3,341,031  9/1967  Myers .......................... 198/33 R Primary Examiner—Evon C. Blunk
Assistant Examiner—Hadd S. Lane
Attorney—Victor M. Helfand ABSTRACT: A hopper-type device for orienting and feeding relatively flat articles having a relatively smooth surface on one side and a broken surface, resistant to a jet of air under pressure, on the other side, including a hopper, a rotating feed disc within the hopper and an outlet ramp positioned to receive articles from the disc, and a nozzle for directing a jet of compressed air against a portion of the ramp to dislodge therefrom articles disposed with broken surface upward thereon for returning into the hopper. In a preferred form of the device, inverted means are provided on which the dislodged articles are landed to return them back into the hopper with broken surface down.

PATENTED AUG 17 1971

3,599,829

INVENTORS
SAMUEL S. AIDLIN
STEPHEN H. AIDLIN
BY
ATTORNEY

HOPPER-TYPE APPARATUS FOR ORIENTING AND FEEDING BOTTLE AND JAR CAPS, OR THE LIKE

The present invention relates to automatic apparatus for orienting and feeding shallow, flanged or cup-shaped articles, such as bottle or jar covers, to a point of destination, as to location whereat such covers may be placed and secured on the containers for which they are intended, and is especially useful for the feeding of lightweight articles, as covers formed of thermoplastic material.

The present invention has for its object the provision of hopper-type apparatus, of the character described, that may orient and feed the articles at a relatively high rate of speed to the location of use.

It is another object of the present invention to provide apparatus, of the character described, which is substantially foolproof and will not jam, and will otherwise require a minimum of care and attention.

It is a further object of the present invention to provide apparatus, of the character described, which is of relatively simple construction, which operates with a minimum of noise, and which may be adapted for the orienting and feeding of articles of various sizes.

The foregoing and other objects and advantages of the orienting and feeding apparatus of the present invention will become more readily apparent to those skilled in the art from the embodiment thereof shown in the accompanying drawing, and from the description following. It is to be understood, however, that such embodiment is shown by way of illustration only, to make the principles and practice of the invention more readily comprehensible, and without any intent of limiting the invention to the specific details thereon shown.

Figure 1:
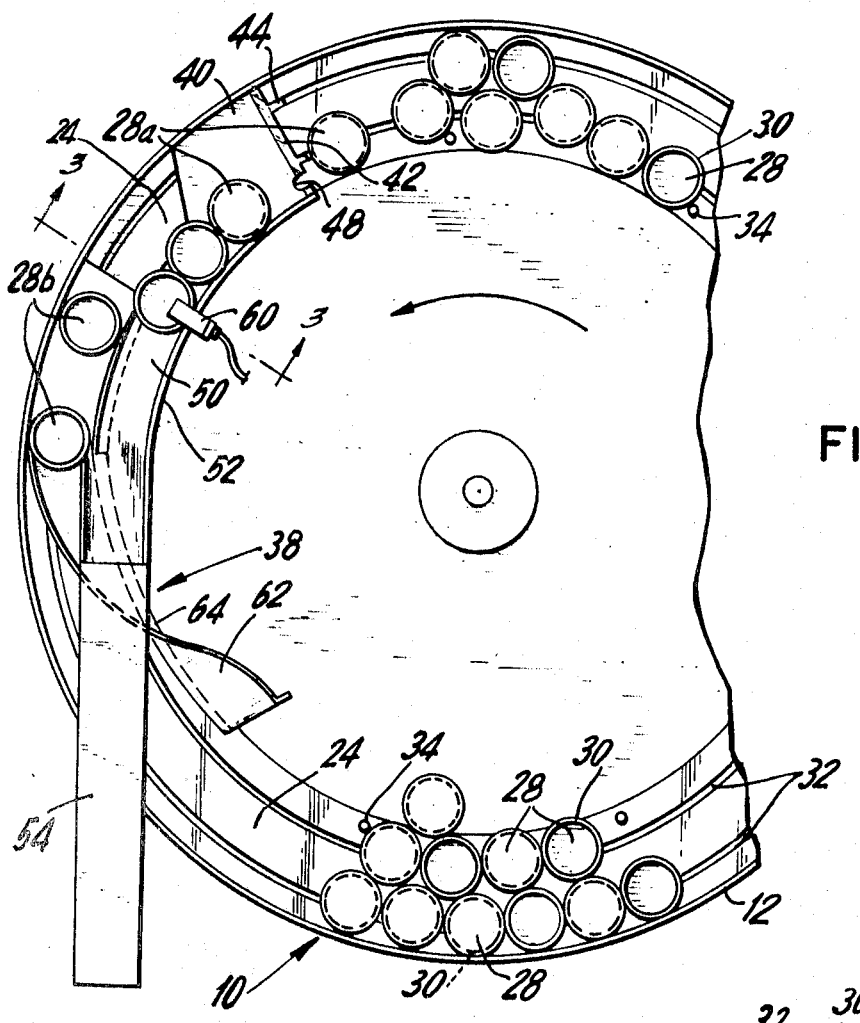
FIG. 1 is a fragmentary, plan view of an orienting and feeding device of the present invention.
Figure 3:
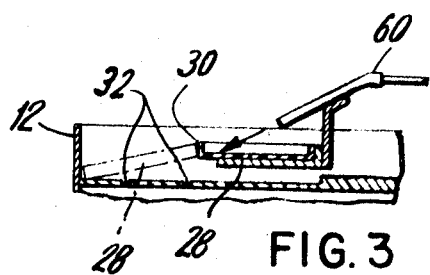
FIG. 3 is a side elevation of the device of FIG. 1, with the wall of the hopper partly broken away and with the inverting means omitted.
Figure 2:
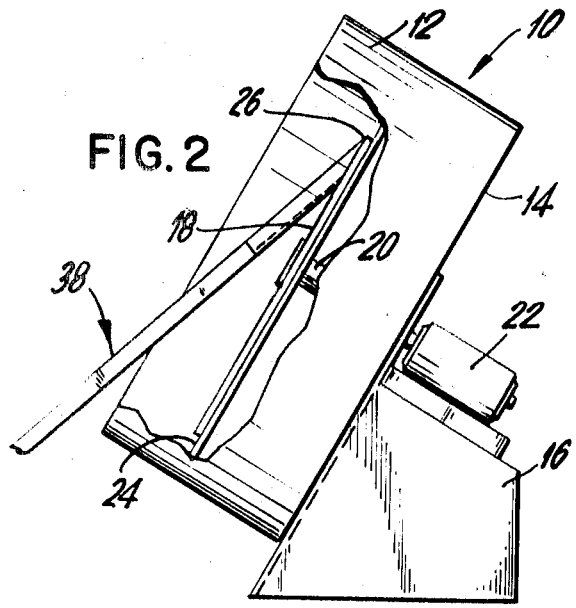
FIG. 2 is a section taken on line 2–2 of FIG. 1.

Generally stated, the present invention takes advantage of the fact that jar, vial and bottle covers, or the like, must be oriented and fed flange down, in order to deliver them in position for capping the containers for which they are intended. To that end, the covers or caps disposed in flange-up position on an outlet ramp or chute leading from a feed hopper must be rejected from said ramp, to prevent their discharge from the hopper of the apparatus. The present invention utilizes the upturned flange of the misoriented cover or cap for the removal of the same from the ramp and accomplishes such end by directing a stream of compressed air against each cover or cap moving along the ramp. All covers or caps moving along the ramp with flange down will not be affected by the stream of air, which will be deflected from the smooth top of the cap or cover. However, such stream of air when blown into the interior of a cap or cover disposed flange up will engage it by its flange to blow it off the ramp.

The present invention also contemplates the inverting of the misoriented caps or covers blown off the ramp to dispose them within the hopper flange down, so that they will thereafter move to the ramp in that position.

Referring more specifically to the embodiment of the invention shown in the drawings, the apparatus of the invention is shown to comprise a hopper, generally designated as 10, including a cylindrical wall, 12, and a bottom 14, by which it may be mounted on a stand, 16, at an angle of about 60° or 65° to the vertical. Disposed within the hopper 10 inwardly of its top and parallel to its bottom 14, is a rotary feed disc, 18, which may be mounted on the shaft, 20, of a motor, 22, that may be supported on the stand 16, in the manner illustrated or in any other suitable manner.

Feed disc 18 is arranged to rotate in a plane parallel to the bottom 14 of the hopper and is preferably formed with a peripheral, annular area, 24, of reduced thickness, to form a shoulder, 26, at its inner edge. The peripheral area 24 may preferably be of a width greater than the maximum width of a single cap or cover 28, which is shown in the drawings to be of circular, shallow cup shape having a low side or flange, 30, but may be of other shape, as rectangular. The floor of the reduced peripheral area 24 may preferably be formed with two or more spaced continuous circular grooves, 32, and may have set thereinto at least one circular row of spaced pushpins, 34, which are preferably arranged at the inner portion of the area 24.

It will be clear that as disc 18 is rotated, as in the counterclockwise direction indicated, pins 34 will pick up or push covers 28 from a pile haphazardly disposed in the bottom of the hopper, to push them in an ascending direction within the reduced area or groove 24, the shoulder 26 preventing their sliding back along the area 24. It will also be clear that because of the excess width of the area 24, the covers 28 may move therealong in two circular rows which may overlap, so that at the top of the hopper any gaps in the inner row of covers 28 may be filled in by covers from the outer row dropping thereinto, to thereby supply a continuous inner row of covers at the top of the hopper and also on its descending side.

An outlet ramp, generally designated as 38, is provided for discharging covers 28 that are properly oriented from the hopper. Such ramp may comprise a head or lead portion, 40, of a width preferably substantially equal to the width of the reduced peripheral area or groove 24 of disc 18, whose forward edge, 42, which may preferably be substantially radially disposed, substantially contacts the surface of the groove 24, slightly to the descending side of the vertical axis of the hopper, as at approximately the "11 o'clock" position. The forward edge 42 of the ramp head 40 may be provided with finger projections, 44, that may fit into the grooves 32, to ensure the picking up of covers therefrom onto the ramp head 40, and with an inwardly extending recess, 48, forming an escape for the pushpins 34.

Ramp 38 is formed with a neck portion, 50, of lesser width than head portion 40 and coextensive with the inner portion thereof. Ramp portion 50 may start at approximately the "10 o'clock" position of the hopper housing and extend downwardly a distance therefrom in spaced relation to the hopper wall 12. Ramp section 50 is provided with a flange, 52, along its inner edge, with its outer edge being flangeless, and the extension thereof, 54, which leads out of the hopper 10 either above the edge of wall 12, as illustrated, or through an opening formed therethrough where the wall 12 at the bottom of the hopper is vertically enlarged. Ramp section 54 is formed with a continuation of flange 52 on its inner edge and is also provided with a flange, 56, on its outer edge, to form a chute which may, if desired, be covered over.

Section 50 of the ramp 38 may preferably be of a width not greater than and, more preferably, less than the width or diameter of a cover 28, but greater than half the width of such diameter. An air nozzle, 60, connectable to a source of air under pressure, is mounted over ramp section 50, in position to direct a stream of air under pressure against a cover 28 moving past such nozzle on ramp section 50.

It will be apparent that as feed disc 18 rotates and moves the rows of covers 28 first ascendingly to the top of the hopper and then descendingly, such covers will be picked up by the ramp head 50; such pickup being assured by fingers 44 riding in grooves 32. The inner row of such covers 28 will be moved along the head portion 40 onto the ramp portion 50. As the covers 28 are picked up from a haphazardly arranged pile of covers from the bottom of the hopper, some of the covers picked up will be disposed with flange down, in properly oriented position, as indicated at 28a, and others will be picked up and moved with the flange upwardly disposed, as indicated at 28b. As bottle covers 28a and 28b are moved along ramp section 50, the stream of air from nozzle 60 will strike the smooth top of the properly oriented covers 28a without affecting their downward movement on the ramp. However, when the stream of air from nozzle 60 strikes covers 28b, having their flanges upwardly directed, the stream of air will strike against the flanges of such covers and slide the same laterally off the unflanged edge of the ramp section 50, to return to the hopper; thus feeding into the chute portion 54 of the ramp only properly oriented covers for discharge from the hopper.

In order to increase the rate of feed of the properly oriented covers 28a from the hopper, means are provided to direct covers 28b that are blown off ramp section 50 to land on disc 18 with their flanges down, so that they may be picked up for another ascending movement in properly oriented position. Such means may comprise an inverter that may consist of a spiraled plate, 62, that may be secured, in any desired manner, to hopper wall 12 or to ramp 38 adjacent ramp section 50, with its upper end substantially parallel to feed disc 18 and in disposed position to receive blown-off covers 28b. Plate 62 is formed with a flange, 64, along its inner edger and its outer downwardly extending portion spirals gradually to a position normal to disc 18, so that covers 28b blown off from ramp section 50, landing on plate 62, will be gradually erected and tipped over the flange 64 to land on feed disc 18 with flange down.

While the apparatus of the present invention has been described as particularly useful for orienting and feeding shallow cup-shaped articles such as jar or bottle caps or covers, it may here be stated that such apparatus is equally useful for orienting and feeding any substantially flat articles having a relatively smooth surface on one side and having on its other side an irregular or broken surface capable of offering resistance to a jet of compressed air directed thereagainst, to be shifted by the force thereof.

This completes the description of the feeding and orienting apparatus of the present invention. It will be readily apparent that the apparatus is highly efficient for its purposes and will feed covers or the like in oriented position at a high rate of speed. It will also be apparent that the apparatus of the present invention is of relatively simple construction and operates automatically with a minimum of care and attention.

It will be further apparent that numerous modifications and variations may be made in the feeding and orienting apparatus of the present invention by anyone skilled in the art, in accordance with the principles of the invention hereinabove set forth, without the exercise of any inventive ingenuity.

We claim:

1. Hopper-type, automatic orienting and feeding apparatus for flat articles having a relatively smooth surface on one side and a broken surface on the other side, said apparatus comprising a hollow, open-top, cylindrical housing, means supporting said housing with its longitudinal axis at an angle to the vertical, a disc closely and freely rotatably supported within said housing in inwardly spaced relation to said open top thereof and in a plane at right angles to said axis, means rotating said disc, said disc having a peripheral marginal edge portion thereof of reduced thickness forming a recess in its upper surface, said recess of a width equal at least to the width of an article to be fed, the inner wall of said recess defining a shoulder, circumferentially spaced pin projections provided on the floor of said recess, and an outlet ramp disposed in a plane substantially normal to said axis and at an angle to the surface of said disc, said ramp having a lead end portion having its lead edge extending into said recess in substantial contact with the floor thereof, said edge disposed substantially radially relative to said disc and entering said recess at a point below the vertical axis of said housing on the descending side of said disc when rotated, a portion of said ramp immediately below said lead end having a flange on its inner edge and its outer edge inwardly spaced from the wall of said housing, and a nozzle connectable to a source of fluid under pressure supported adjacent said last-named ramp portion in position to direct a jet of compressed air against said ramp portion whereby an article moving on said ramp portion with its broken surface upward is shifted by said air jet from said ramp portion into the space between its outer edge and the wall of said housing.

2. The orienting and feeding apparatus of claim 1, including means within said housing arranged to receive thereon an article displaced from said lower ramp portion, and directing the same in inverted position to the surface of said disc.

3. The orienting and feeding apparatus of claim 2, wherein said directing and inverting means comprise a spiraled strip of material, one end of said strip being disposed adjacent said second named ramp portion in substantially parallel relation to said disc, said strip spiraled in a downward direction within said hopper to bring its outer edge at its other end into substantially vertical position, said strip having an upstanding flange at its inner edge.

4. The orienting and feeding apparatus of claim 1, wherein said lead end portion of said ramp is of a width substantially equal to the width of said recess.

5. The orienting and feeding apparatus of claim 4, wherein said recess is of a width greater than the width of the article to be fed.

6. The orienting and feeding apparatus of claim 4, wherein at least one continuous circularly arranged groove is formed in the floor of said recess and wherein a projection is provided on said lead edge of said ramp extending into said groove, to thereby ensure the movement of articles from said recess onto said ramp.

7. The apparatus of claim 1, wherein an inwardly extending recess is formed in the forward end of said lead portion of said ramp arranged to permit the clearance of the pushpins therethrough.

8. The orienting and feeding apparatus of claim 1, wherein said portion of said ramp immediately below said lead end thereof is of a width less than the greatest width of an article to be fed but not less than half the width of the article.